United States Patent [19]
Miki

[11] 3,751,147
[45] Aug. 7, 1973

[54] TRICK PHOTOGRAPHING SYSTEM IN A MOTOR DRIVEN MOTION PICTURE CAMERA

[75] Inventor: Yukio Miki, Osaka, Japan

[73] Assignee: Minolta Camera Kabushiki Kaisha, Osaka-fu, Japan

[22] Filed: Oct. 15, 1971

[21] Appl. No.: 189,503

[30] Foreign Application Priority Data
Oct. 20, 1970 Japan.............................. 45/103599

[52] U.S. Cl. .................................................. 352/91
[51] Int. Cl. .......................................... G03b 21/36
[58] Field of Search ........................................ 352/91

[56] References Cited
UNITED STATES PATENTS
3,549,249 12/1970 Katsuyama............................ 352/91

Primary Examiner—Samuel S. Matthews
Assistant Examiner—Russell E. Adams, Jr.
Attorney—Watson, Cole, Grindle & Watson

[57] ABSTRACT

A trick photographing system in a motor driven motion picture camera provided with a reversible overlap mechanism which comprises two time setting plates, a swing lever and an operating plate which is functional not only to open and close the shutter but also to make operative a switch for switching a motor circuit from the normal direction to the reverse direction or vice versa, whereby, a sequence a fade-out photographing, a film rewinding and a fade-in photographing is effected.

To change the trick photographing time in such a system, supporting point of the swing lever is made slidable along both sliding surfaces of one of said time setting plates and said operating plate.

4 Claims, 5 Drawing Figures

INVENTOR

TRICK PHOTOGRAPHING SYSTEM IN A MOTOR DRIVEN MOTION PICTURE CAMERA

BACKGROUND OF THE INVENTION

The present invention relates to a novel trick photographing system, in a motor driven motion picture camera, which is provided with a reversible overlap mechanism capable of performing a fade-out photographing, a film rewinding and a fade-in photographing; and more particularly, to such a system provided with a mechanism capable of controlling the trick photographing time.

Heretofore, a device capable of performing a fade-out photographing, a film rewinding and a fade-in photographing is well known. However, its mechanism somewhat complex and the handling thereof is accordingly troublesome. Moreover, in the trick photographing system of a motor driven motion picture camera of the prior art, the change-over of its drive from the normal direction to the reverse direction or vice versa is achieved by moving a time setting member by a definite amount. Consequently, when it is desired to change the trick photographing time, particularly in during an overlap photographing of a short duration, even though a fade-out photographing is completed, the camera is still kept in a driving status. Also, when the time setting member is moved to a predetermined position, it is for the first time shifted to the reverse direction, after which the film is rewound back to the position at which the fade-out photographing was started. As the result, even if the trick photographing time in such a known system is changed, since the change-over for the normal drive and the reverse drive is always carried into effect by moving the time setting member by a definite amount, an excessive drive cannot be avoided during a trick photographing of especially a short duration. Accordingly, the system was defective in that the battery power was uselessly consumed, the photographing time was wastefully extended, and the photographer was anxious at all times during the process.

OBJECTS OF THE INVENTION

It is an object of the present invention to provide a trick photographing system provided with a novel reversible mechanism for an overlap photographing which has a fade-out photographing, a film rewinding and a fade-in photographing capability.

It is another object of the present invention to provide a trick photographing system, in an overlap photographing apparatus, which is provided with a suitable means for adjusting the trick photographing time.

It is still another object of the present invention to provide a trick photographing system in an overlap photographing apparatus, wherein the moving speed of an operating plate for controlling the angular opening of the shutter is variable corresponding to the length of the trick photographing time, and a normal-reverse rotation change-over switch for driving the camera is operated by the action of said operating plate.

SUMMARY OF THE INVENTION

In accordance with present invention a trick photographing system in an overlap photographing apparatus is arranged, in such a way that in a motor driven motion picture camera provided with a reversible mechanism for an overlap photographing consisting of a fade-out photographing, a film rewinding and a fade-in photographing, there are provided a time setting plate on the side to control the angular opening of the shutter, a time setting plate on the side to regulate the rewinding operation, and a swing plate located between said time setting plate on the side to control an angular opening of the shutter and an operating plate for controlling the angular opening of the shutter is provided. Further provided is a normal-reverse rotation change-over switch which is capable of reversing the drive of the camera concurrently with the completion of a fade-out photographing which is effected in conjunction with the turning of the operating plate for controlling the angular opening of the shutter, whereby, said swing plate is slidably moved parallel to and along the sliding surface of the time setting plate as well as the sliding surface of the operating plate.

In such a system according to the present invention, any change of an overlap photographing time can be carried into effect by a simple operation merely to move the swing plate located between the time setting plate and the operating plate. And, since the normal-reverse rotation change-over switch for use in the system of the camera is so formed as to be switched in, conjunction with the turning of the operating plate, the drive is changed over to the reverse side concurrently with the completion of a fade-out photographing, regardless of the length of the overlap photographing time. This results in that any wasteful time and any useless consumption of the battery power are avoided, and that the film rewinding and the fade-in photographing operations can be continuously carried into effect, thereby providing an outstanding advantage in the practical use thereof.

DRAWINGS

FIG. 1 is a side view showing the internal arrangement of an embodiment according to the present invention in the case of a normal photographing, FIG. 2 is a side view showing a condition in the same embodiment as shown in FIG. 1 according to the present invention at the time when a fade-out photographing has been completed in the case of a trick photographing, FIG. 3 is a side view showing a condition in the same embodiment as shown in FIG. 1 according to the present invention at the time when a film winding has been completed and the drive thereof has been stopped in the case of a trick photographing, FIG. 4 is a side view showing a condition in the same embodiment as shown in FIG. 1 according to the present invention at the time when a fade-in photographing has been completed in the case where the trick photographing time was changed, and FIG. 5 is a circuit diagram in the same embodiment as shown in FIG. 1 in accordance with the present invention.

DESCRIPTION OF THE PREFERRED EMBODIMENTS

Figure 1:
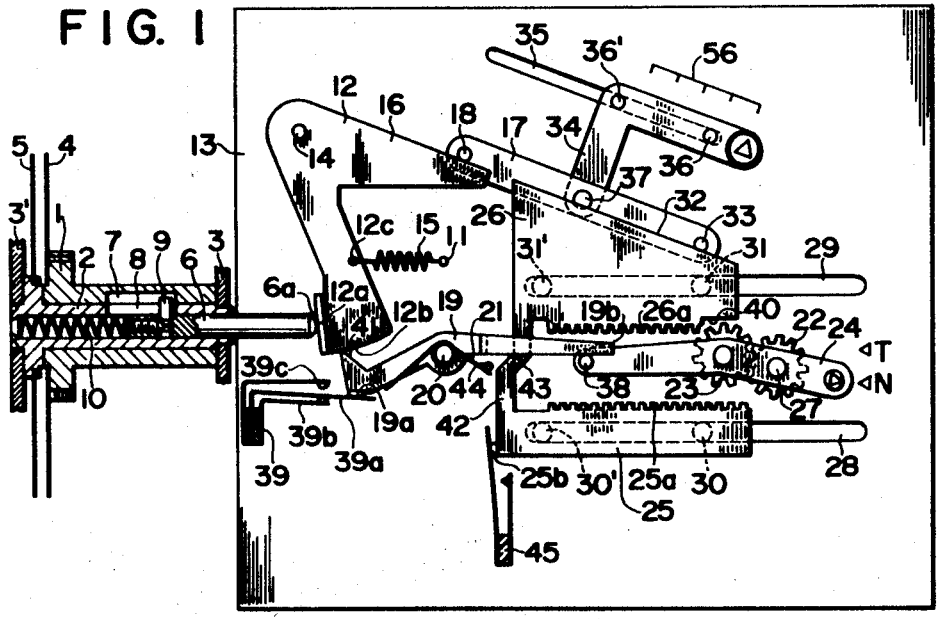

The arrangement of the presently devised system is hereinafter described with reference to FIG. 1 in which a gear 1 shown on the left is rotated via any gear system by means of a drive motor not shown, and is rotatably mounted on a hollow shaft 2. The hollow shaft 2 is rotatably fitted to the portions 3 and 3' of the camera body. A shutter blade 4 is fixed to gear 1, whereas, another shutter blade 5 is fixed to hollow shaft 2. A rod 6, which varies the angular opening formed between two shutter blades 4 and 5, is slidably mounted within hollow shaft 2, and a cam pin 9, which projects from one end of rod 6, is slidably inserted into a cam groove 7 formed on the inner surface of gear 1, as well as into another cam groove 8 formed on the inner surface of hollow shaft 2.

Accordingly, the relative angle between gear 1 and hollow shaft 2 is variable corresponding to the position at which cam pin 9 is engaged with both cam grooves 7 and 8. The angular opening of the shutter is thereby made variable and is defined by the relative angle therebetween. When rod 6 is projected towards the right as shown in FIG. 1, the shutter blades are positioned in a fully open condition, and when the rod 6 is moved to the extreme left end as shown in FIG. 2, the shutter blades are in a fully closed condition. A spring 10, the hollow shaft 2, urges rod 6 towards the right. The the extreme end 6a of rod 6 is thereby always maintained in contact with the left end face 12a of an operating plate 12.

The operating plate 12, which is rotatably pivoted on an axle 14 fixed to the body base plate 13, is given a counter-clockwise turning tendency by means of a spring 15 which is mounted to a pin 12c on operating plate 12 and a pin 11 located on base plate 13. Moreover, operating plate 12 is provided with a sliding surface 16, a left end face 12a and a lower end face 12b formed separately on operating plate 12. Sliding surface 16 is engaged with a protrusion pin 18 provided on a swing lever 17, left end face 12a being maintained in contact with the extreme end 6a of rod 6, and lower end face 12b confronting a pawl 41 formed on the left end of a normal-reverse rotation change-over lever 19. Accordingly, the angular opening between both shutter blades 4 and 5 is made variable by virtue of the turning of operating plate 12.

The normal-reverse rotation change-over lever 19, which is rotatably mounted on an axle 20 located on base plate 13, is given a clockwise turning tendency by means of a spring 21 which is fitted to axle 20 and to a stopper pin 44 by its own partial winding. However, the clockwise turning of the normal-reverse rotation change-over lever 19 is capable of being obstructed by stopper pin 44.

The normal-reverse rotation change-over lever 19 is arranged such that its lower left end 19a closes both contact pieces 39a and 39b on the normal rotation side of the normal-reverse rotation change-over switch 39. This occurs when the right arm 19b of lever 19 is engaged with a protrusion pin 38 of a manual lever 24 at such time as manual lever 24 is set to the indicia "N" side indicating the Normal Photographing (see FIG. 1.). During this Normal Photographing, pawl 41 on the left end of the lever 19 is located near lower end face 12b of the operating lever 12. If manual lever 24 is set to the indicia "T" side indicating the Trick Photographing as shown in FIG. 2, right arm 19b of lever 19 is released from the obstruction offered by protrusion pin 38, the pawl 41 on and left end of lever 19 is thereby brought into contact with lower end face 12b of operating plate 12. However, the normal-reverse rotation change-over switch 39 is arranged such that its contact pieces 39a and 39b on the normal rotation side remains closed during this operation.

Figure 2:
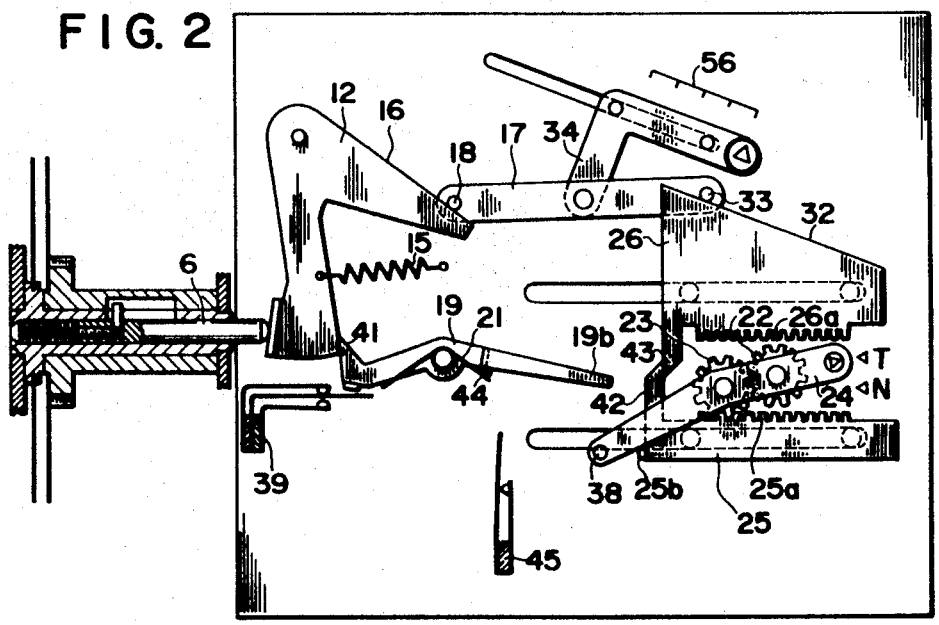

A gear 22, shown in FIG. 1 at the lower right end, is coaxially journalled on a turning axis 27 of manual lever 24, and is rotated via any gear system by means of a drive motor 49 (shown in the circuit diagram of FIG. 5), is further meshed with a gear 23. The gear 23, which is also journalled on manual lever 24, is arranged to be engaged with the teeth on either one of toothed racks 25a and 26a when the manual lever 24 is set to either the Trick Photographing side T or the Normal Photographing side N.

The protrusion pin 38, on the left end of manual lever 24, is engaged with arm 19b when manual lever 24 is positioned on the normal photographing side N. and turns lever 19 counterclockwise against the bias of spring 21. Accordingly, lower left end 19a of lever 19 closes both contact pieces 39a and 39b on the normal rotation side of the normal-reverse rotation changeover switch 39. Additionally, the manual lever is provided with clicks of a suitable strength which is applied thereto at the respective positions where gear 23 is engaged with either one of the rack teeth 25a and 26a when the manual lever 24 is set to either the normal photographing N or the trick photographing T.

Two time setting plates 25 and 26, which are provided respectively with said rack teeth 25a and 26a are slidably fitted to base plate 13 by means of a pair of pins 30, 30', and a pair of pins 31 and 31', each respective pair being inserted into slots 28 and 29 located base plate 13 of the camera body. The time setting plates 25 and 26 each are provided with a light friction brake not shown in the drawing, so that they cannot to be dislodged from their definite positions due to any possible vibration or due to a slight force.

Figure 5:
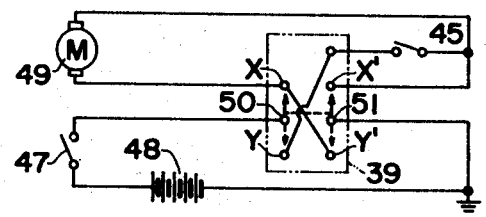

A projection 25b located on the left end of lower time setting plate 25 is engaged with a reverse rotation stop switch 45 when time setting plate 25 is located at the extreme left end as shown in FIG. 1 during normal photographing, so that reverse rotation stop switch 45 is thereby maintained opened (refer to the circuit diagram in FIG. 5). But, when lower time setting plate 25 is moved towards the right, reverse rotation stop switch 45 is closed. On the other hand, another projection 42, extending upwardly from the left end of lower time setting plate 25, is engaged with a like projection 43 extending downwardly from the left end of upper time setting plate 26.

A slant sliding surface 32 is formed on upper time setting plate 26, and a second protrusion pin 33 located on the right end of swing lever 17, is in contact with sliding surface 32. An L shaped variable timing lever 34 is slidably fitted to base plate 13 by means of two pins 36 and 36' which are both inserted into a slot 35 obliquely oriented in base plate 13 of the body, and is provided with a friction brake (not shown) designed to hold L shaped lever 34 at any appropriate positions. A scale 56 is provided parallel to the slot 35 for the purpose of identifying the set-up position of L-shaped variable timing lever 34. Also, swing lever 17 is pivotally mounted on an axle 37 which is provided on the underside of L-shaped variable timing lever 34. The swing lever 17 is balanced by virtue of first protrusion pin 18 and second protrusion pin 33 which are both located on swing lever 17, and are engaged respectively with sliding surface 16 of operating plate 12 and sliding surface 32 of upper time setting plate 26.

In the circuit diagram shown in FIG. 5, a drive motor 49, a switch 47 interlocking with the shutter release, and a normal-reverse rotation change-over switch 39 are shown connected in series with respect to a power source 48. The normal-reverse rotation change-over switch 39 is provided with interlocking contact pieces 50 and 51, and is provided with opposite pairs of contact points X, X', Y and Y', contact point X and contact point Y' being mutually interconnected. The reverse rotation stop switch 45 is interposed between contact point Y and the motor circuit. It is so arranged that drive motor 49 is rotated in the normal direction when contact pieces 50 and 51 are connected to the side of both contact points X and X', and drive motor 49 is switched to the reverse rotation when the contact pieces 50 and 51 are shifted so as to be connected to the side of both contact points Y and Y'.

The above-described device is operated in the following manner.

1. Normal photographing

The manual lever 24 is positioned on the normal photographing side N as shown in FIG. 1. Since projection pin 38 located on manual lever 24 is thereby engaged with right arm 19b of normal-reverse rotation change-over lever 19, lower left end 19a of change-over lever 19 closes both contact pieces 39a and 39b to the normal rotation side of normal-reverse rotation change-over switch 39. The shutter blades 4 and 5 are kept fully opened in this position of lever 24, since rod 6, which has the opening between the shutter blades 4 and 5 changed, is extended fully to the right. As seen in FIG. 1 since gear 23 on manual lever 24 is positioned adjacent a toothless portion 40 provided in rack teeth 26a on upper time setting plate 26, if camera in this situation is driven, the drive motor 49 is rotated in the normal direction, and gear 22 is concurrently rotated. Whereas, 23 meshed with gear 22 is merely idled, so that time setting plate 26 is maintained in its stopped condition, operating plate 12 is also maintained stationary, rod 6 is not moved at all, and the shutter blades are maintained in their fully opened positions. The normal photographing is thereby carried out.

2. Overlap photographing

A. Fade-out photographing

First of all, manual lever 24 is shifted to the trick photographing side T, gear 23 is meshed with rack teeth 25a of lower time setting plate 25, and projection pin 38 erected on the manual lever 24 is lowered down from right arm 19b of normal-reverse rotation change-over lever 19. Accordingly, pawl 41 on the left end of change-over lever 19 comes into contact with lower end face 12b of operating plate 12. Whereas, contact pieces 39a and 39b on the normal rotation side of normal-reverse rotation change-over switch 39 are still maintained closed in this situation also, by reason of lower left end 19a of change-over lever 19 pressing against contact piece 39a.

Thereafter, if the shutter release is pressed, switch 47 interlocking therewith is closed, drive motor 49 is thereby activated to its normal rotational drive, gear 23 is accordingly rotated counterclockwise by gear 22 and, consequently, lower time setting plate 25 is moved to the right via rack teeth 25a which is engaged with gear 23. Due to the rightward movement of lower time setting plate 25, upper time setting plate 26 is also moved to the right by reason of the engagement between projection 42 of lower time setting plate 25 and projection 43 of upper time setting plate 26.

If upper time setting plate 26 begins to move to the right, second projection pin 33 on swing lever 17 is pushed upwardly by slant sliding surface 32 of upper time setting plate 26 and swing lever 17 thereby commences to turn counterclockwise about axis 37. The first protrusion pin 18 of swing lever 17 pushes down sliding surface 16 of operating plate 12 and operating lever 12 is thereby turned clockwise about axle 14 against the bias of spring 15. Rod 6 is accordingly pushed to the left by left end face 12a of operating plate 12. Consequently, shutter blades 4 and 5 are gradually closed so that the fade-out photographing is carried into effect.

FIG. 2 shows a condition in which the fade-out photographing has just been completed, so that operating plate 12 has rod 6 pushed fully back to its extreme left end, and lower end face 12b of operating plate 12 is disengaged from pawl 41 on the left end of normal-reverse rotation change-over lever 19.

B. Rewinding

The normal-reverse rotation change-over lever 19 is rotated clockwise under the bias of spring 21 up to the position where it comes into contact with stopper pin 44; normal-reverse rotation change-over switch 39 is thereby allowed to close both contact pieces 39a and 39c on its reverse rotation side as shown in FIG. 2. That is, both contact pieces 50 and 51 in FIG. 5 are shifted onto contact points Y and Y' so as to connect the motor circuit to the reverse rotation side. At this moment, gear 23 is still maintained in its engagement with rack teeth 25a of lower time setting plate 25, and reverse rotation stop switch 45 is still maintained in its closed situation since switch 45 has been disengaged from lower time setting plate 25 by reason of the rightward movement of lower time setting plate 25. Consequently, reverse rotation of the drive motor 49 is immediately started at this moment. Due to this reverse rotation of drive motor 49, gear 23 is rotated clockwise so as to effect leftward movement of lower time setting plate 25 only. Accordingly upper time setting plate 26 is maintained stationary at its existing position so that both shutter blades 4 and 5 are also held stationary at their closed positions.

When lower time setting plate 25 is further moved to the left and finally reaches the position where the fade-out photographing was started, that is, when the film is rewound by the length of the time as the fade-out photographing has been carried out, reverse rotation stop switch 45 is opened and drive motor 49 is therefore stopped.

C. Fade-in photographing

Figure 3:
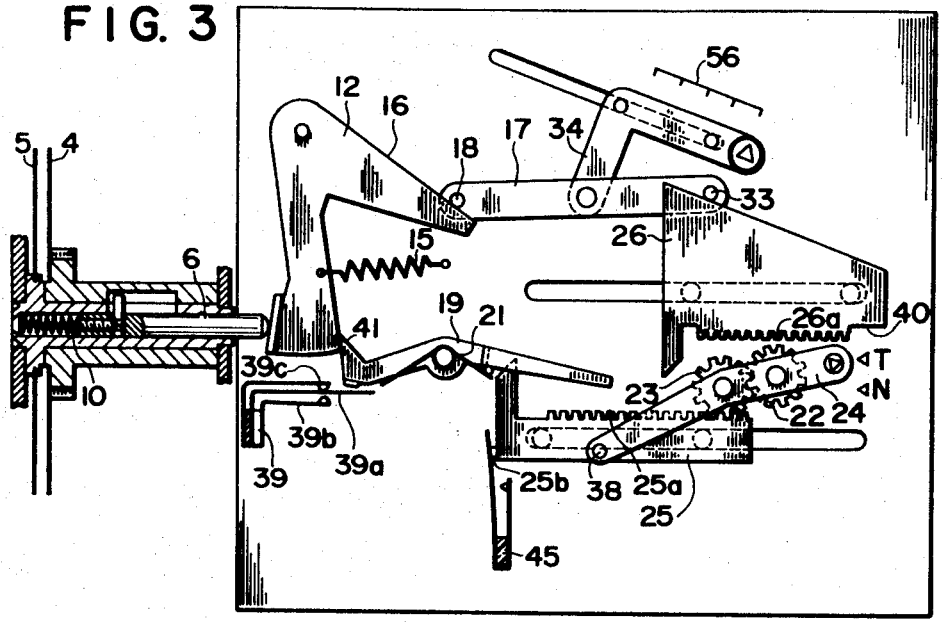

FIG. 3 shows a condition in which the film rewinding has been completed and the drive has been terminated. If manual lever 24 is returned to the normal photographing side N from this situation, projection pin 38 on manual lever 24 is engaged with right arm 19b of normal-reverse rotation change-over lever 19, which is thereby turned counterclockwise about axis 20 against the bias of spring 21. Accordingly, pawl 41 on the left end of change-over lever 19 departs from operating plate 12 so as to force normal-reverse rotation change-over switch 39 to close its contact pieces 39a and 39b on the normal rotation side. On the other hand, gear 23 is engaged with rack teeth 26b of upper time setting plate 26. Consequently, when the shutter release is pressed, switch 47 interlocking therewith is closed, and the drive motor begins to thereby rotate in the normal direction so that upper time setting plate 26 commences to move leftwards.

Consequently, second projection pin 33 on swing lever 17, which is engaged with slant sliding surface 32 of upper time setting plate 26, descends, so that first projection pin 18 on swing lever 17 in turn ascends, said operating plate 12 being accordingly turned counterclockwise by the bias of spring 15. In conjunction with the counterclockwise turning of operating plate 12, rod 6 is moved to the right, and shutter blades 4 and 5 are thereby opened so that the fade-in photographing is carried into effect.

When upper time setting plate 26 is further moved leftwards and reaches the position where the fade-out photographing commenced, that is, when the film is rewound by the length of time as the fade-out photographing has been carried out, the shutter blades are fully opened so as to terminate the fade-in photographing and to restore the initial condition as shown in FIG. 1. Accordingly, gear 23 is located at toothless portion 40 in rack teeth 26a and is idly rotated, so that the condition in which the normal photographing can be continuously carried out is restored.

Figure 4:
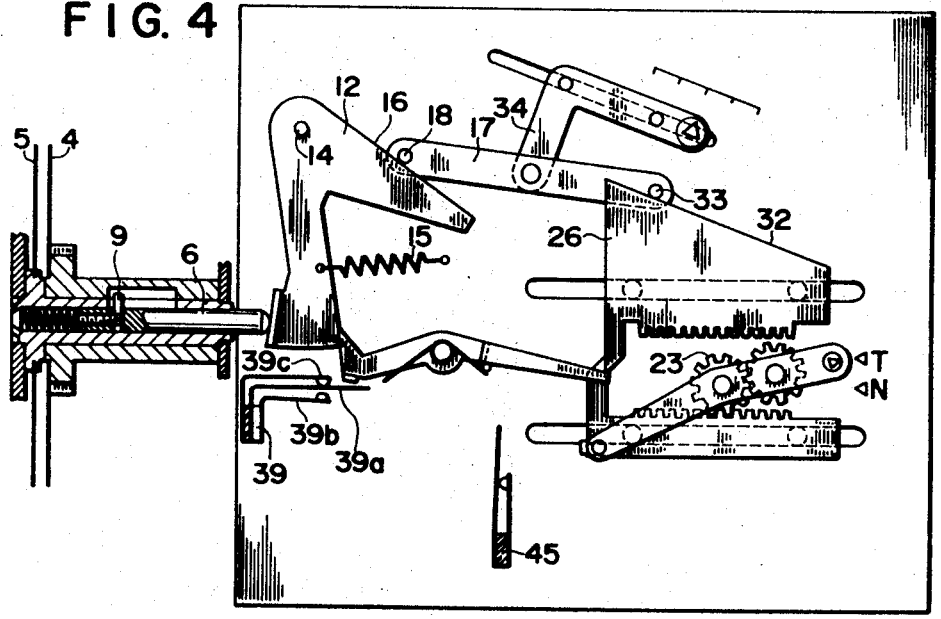

D. A condition in which the overlap photographing time is made shorter as compared to these conditions described above The L-shaped variable timing lever 34 is first shifted diagonally upwardly and to the left along scale 56 as shown in FIG. 4. Concurrently therewith, swing lever 17, which is pivotally supported on axis 37 on L-shaped variable timing lever 34, is shifted to the left. The first pro-trusion pin 18 and second protrusion pin 33 on swing lever 17 are together transferred to the left so that first protrusion pin 18 comes into contact with sliding surface 16 at a point thereof near turning axis 14 of operating plate 12. In this case, as shown in FIG. 1, since first protrusion pin 18 and second protrusion pin 33 on swing lever 17 are so arranged as to move parallel to both sliding surfaces 16 and 32, operating plate 18 is never moved in spite of movement of the L-shaped variable timing lever 34, but is maintained stationary in its stopped situation. Consequently, shutter blades 4 and 5 are also maintained at their fully opened positions.

If the overlap photographing is attempted in this situation, a fade-out photographing is first carried out as descirbed above. In this case, the overlap photographing time will be extended proportionally to the length of the distance from turning axis 14 of operating plate 12 to first protrusion pin 18, said length being defined by the set-up position of L-shaped variable timing lever 34. In other words, the turning angle of operating plate 12 required to effect movement of rod 6 between its extreme ends (namely, between both positions of the shutter) is always constant. Therefore, when first protrusion pin 18 is located near turning axis 14, operating plate 12 can be completely turned by a comparatively small amount of movement of first protrusion pin 18 and second protrusion pin 33; whereas, when first protrusion pin 18 is located at a point farther spaced apart from turning axis 14, a comparatively large amount of movement of first protrusion pin 18 and second protrusion pin 33 is required for the complete turning of operating plate 12. It is a matter of course that the overlap photographing time can be defined by the amount of said movement of first protrusion pin 18 as well as by the set-up position thereof.

Upon completion of the fade-out photographing due to the complete turning of operating plate 12, normal-reverse rotation change-over switch 39 is shifted, both time setting plates 25 and 26 are therefore driven inversely from their locations displaced by the amount of their movement corresponding to the set-up position of L-shaped variable timing lever 34 and, accordingly, such operations of a film rewinding and a fade-in photographing as described hereinbefore are capable of being conti-nuously carried into effect.

When first protrusion pin 18 is located as closely to the turning axis 14 of the operating plate 12 as possible, the displaced amount of time setting plate 25 and 26 can be minimized. Therefore, the total time required for the fade-out, the film rewinding and the fade-in photographing operations can also be minimized.

According to the present invention, as described hereinabove, a projecting pin engaging with an operating plate which is interlocked with the angular opening between shutter blades in slid so as to enable the opening/closing time of the angular opening to be varied while the opening angle is always constant. The overlap photographing time thereby made automatically variable by merely shifting an L-shaped variable timing lever. Moreover, the operating plate is related to a normal-reverse rotation change-over switch for driving the camera and, consequently, the drive is switched to the reverse rotation simultaneously with the completion of a fade-out photographing, so that the film rewinding can be continuously carried out.

What is claimed is:

1. In a motor driven motion picture camera apparatus for controlling fade-in and fade-out photography, comprising:

a driving motor (49) movable in a normal and a reverse direction;

a first energizing circuit for driving said motor in said normal direction;

a second energizing circuit for driving said motor in said reverse direction, said second circuit including a contact switch (45) to open and close said second energizing circuit;

a change-over switch (39) for selectively connecting either of said first and second energizing circuit to said motor;

a member (24) mounted for manual setting in either a normal position (N) or in a fade position (T) and having a transmission means (22, 23) mounted thereon and driven by said driving motor;

a shutter blade member (4, 5) mounted for movement to positions between a closed condition and a fully open condition;

a first control member (12) for controlling the opening of said shutter blade member as a function of a position thereof, and means urging said first control member toward the shutter blade opening position;

a rocking member (19) mounted for movement into a position to restrain said first control member in the shutter blade closing position when said first control member reaches the shutter blade closing position, and actuatable on said changeover switch in such a manner that the change-over switch connects said second energizing circuit to said driving motor with the rocking member in the restraining position and connects said first energizing circuit to said driving motor with said rocking member retracted from the restraining position, said manually settable member (24) being engageable, in the normal position thereof, with said rocking member (19) to retract said rocking member from said restraining position;

means (12b) on said first control member for maintaining said rocking member retracted from the restraining position with said first control member in shutter blade opening position regardless of the position of said manually settable member;

a second control member (26) mounted for movement between a first position and second position, said second control member being engageable in the second position thereof with said transmission means to be driven to the second position with said manually settable member being in the normal position, and said second control member being disengageable in the first position thereof from said transmission means with said manually settable member being in the normal position;

a third control member (25) mounted for movement between a first position and a second position, and engageable with said transmission means to be driven thereby with said manual member in said first position, said third control member further engageable with said second control member to bring the latter from the first to second position thereof when the third control member is driven from the first to the second position thereof; said contact switch being opened with said third control member in the first position;

intermediate means (17) for interconnecting said first control member with said second control member to transmit the movement of the second control member to the first control member whereby said first control member is driven from the shutter blade fully open position to the shutter blade closing position with said second control member driven from the first to the second position thereof, and vice versa; and means (34) for varying the transmission ratio of said intermediate means to vary the length of fade-in and fade-out.

2. The apparatus according to claim 1, wherein said rocking member comprises a lever urged towards the restraining position, and said means for maintaining said rocking member retracted being formed on said first control member as a periphery thereof having an extension engageable with said lever while the first control member is in the position to open the shutter blade.

3. The apparatus according to claim 1, wherein said second control member is provided with a rack gear thereon to facilitate the engagement with said transmission means, said second control member also being provided with a sliding surface thereon lying at an oblique angle to said rack gear, a linkage element (42) on said third control member to facilitate the engagement with said second control member in bringing the latter from the first to the second position thereof when said third control member is driven from the first to the second position thereof, said third control member being provided with a rack gear thereon to facilitate the engagement with said transmission means, said second and third control members each being mounted for sliding movement parallel to one another, and wherein said second control member is capable of pushing said first control member from its shutter blade fully open position to its shutter blade closing position when said second control member is slid by means of engagement with said linkage element.

4. The apparatus according to claim 3, further comprising a lever (34) mounted for manual sliding movement parallel to said sliding surface of said second control member, said lever being also mounted for setting it at a predetermined position, and wherein said intermediate means comprises a swing lever (17) pivotally mounted on said lever (34), said swing lever being engaged with said sliding surface of said second control member and is further engaged with said first control member.

* * * * *